US009405921B1

(12) United States Patent
Schreiber et al.

(10) Patent No.: US 9,405,921 B1
(45) Date of Patent: Aug. 2, 2016

(54) COMPUTER-IMPLEMENTED METHOD FOR ROLE DISCOVERY IN ACCESS CONTROL SYSTEMS

(75) Inventors: Robert Samuel Schreiber, Palo Alto, CA (US); Robert E. Tarjan, Princeton, NJ (US); Mehul A. Shah, Saratoga, CA (US); William G. Horne, Lawrenceville, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2796 days.

(21) Appl. No.: 11/888,381

(22) Filed: Jul. 31, 2007

(51) Int. Cl.
*G06F 21/62* (2013.01)

(52) U.S. Cl.
CPC .................................. *G06F 21/6218* (2013.01)

(58) Field of Classification Search
CPC .................................................. G06F 21/6218
USPC ......................................................... 726/1–4
See application file for complete search history.

(56) References Cited

U.S. PATENT DOCUMENTS

| | | | |
|---|---|---|---|
| 5,173,939 A | 12/1992 | Abadi et al. | |
| 5,911,143 A | 6/1999 | Deinhart et al. | |
| 6,023,765 A | 2/2000 | Kuhn | |
| 6,055,637 A | 4/2000 | Hudson et al. | |
| 6,088,679 A | 7/2000 | Barkley | |
| 6,768,988 B2 | 7/2004 | Boreham et al. | |
| 6,785,686 B2 | 8/2004 | Boreham et al. | |
| 6,947,989 B2 | 9/2005 | Gullotta et al. | |
| 6,985,955 B2 | 1/2006 | Gullotta et al. | |
| 7,016,907 B2 | 3/2006 | Boreham et al. | |
| 7,130,839 B2 | 10/2006 | Boreham et al. | |
| 7,131,000 B2 | 10/2006 | Bradee | |
| 7,284,000 B2 | 10/2007 | Kuehr-McLaren et al. | |
| 2003/0172161 A1 | 9/2003 | Rymon | |
| 2004/0243546 A1 | 12/2004 | Mishra et al. | |
| 2005/0138419 A1 | 6/2005 | Gupta et al. | |
| 2005/0138420 A1 | 6/2005 | Sampathkumar et al. | |

OTHER PUBLICATIONS ("A neural network for the minumum set covering problem", Mhand Hifi et al., University of Paris, France, 2000).*
Ene, Alina et al.; "Fast Exact and Heuristic Methods for Role Minimization Problems" Jun. 2008; 1-10; Association for Computing Machinery; New York, NY, USA.

* cited by examiner

*Primary Examiner* — Saleh Najjar
*Assistant Examiner* — Simon Kanaan
(74) *Attorney, Agent, or Firm* — Okamoto & Benedicto LLP

(57) ABSTRACT

One embodiment relates to a computer-implemented method for role discovery in access control systems. User accounts are selected according to a predetermined algorithm. For each selected user account, a new role is created covering a set of permissions including all permissions which the user account needs but is not yet covered by another role that the user account has. The new role is given to the user account so that all permissions needed by the user account are covered. Any additional user accounts which still need the set of permissions covered by the new role are also found, and the new role is given to these additional user accounts, if any. Other features, aspects and embodiments are also disclosed.

21 Claims, 16 Drawing Sheets

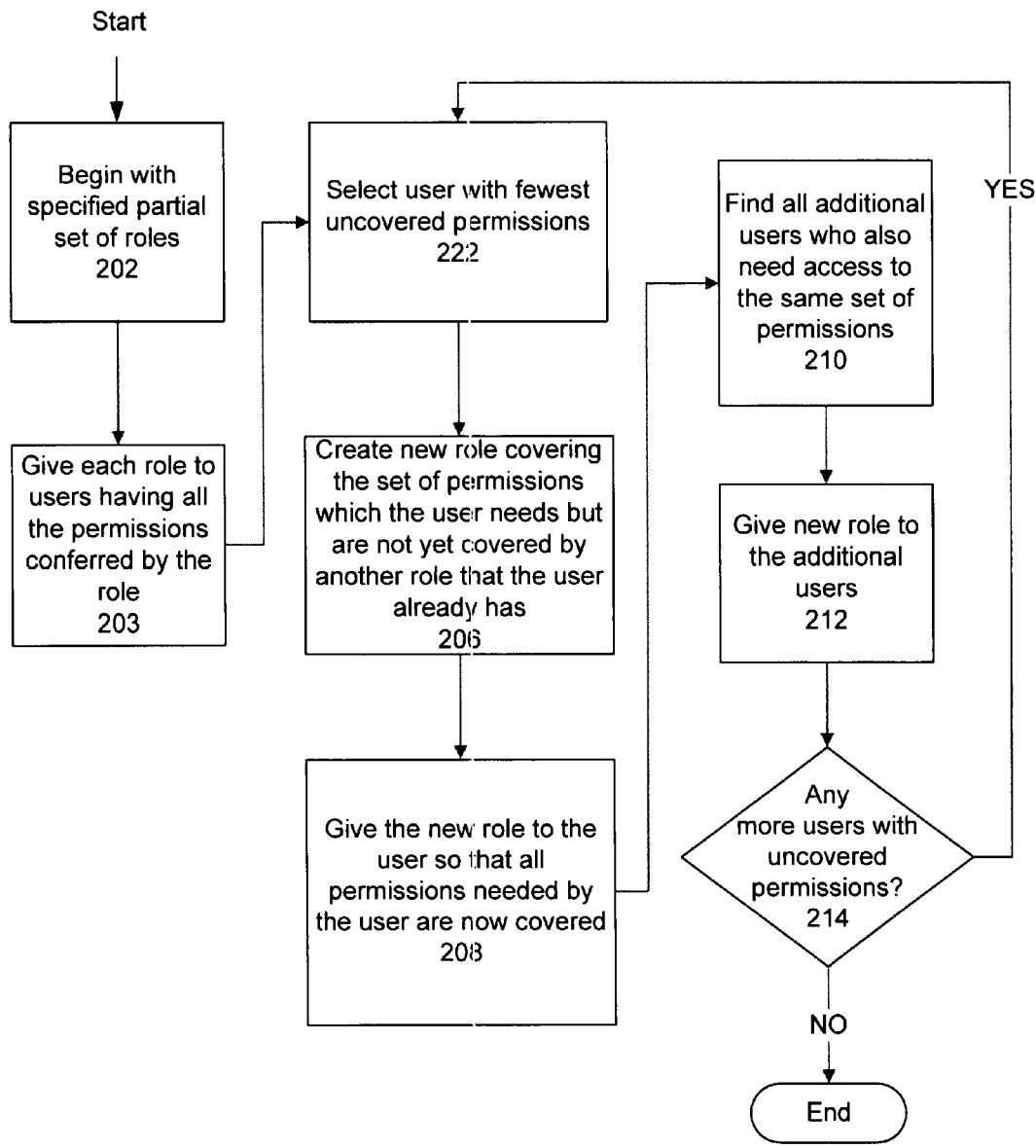
FIG. 2B     220

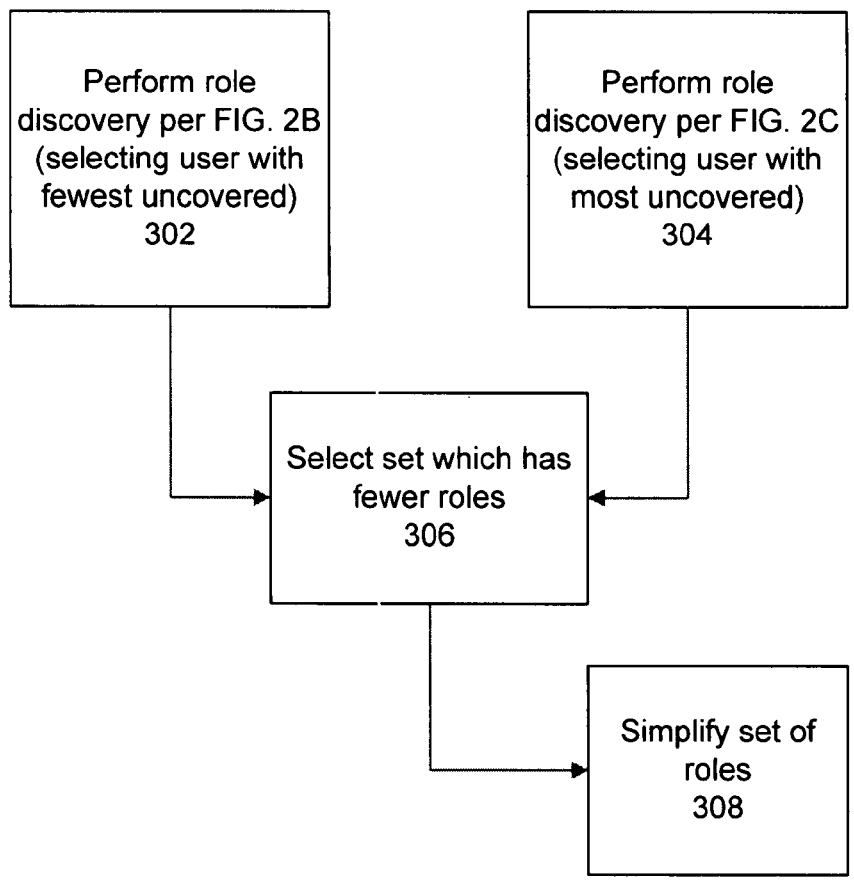
FIG. 3A    300
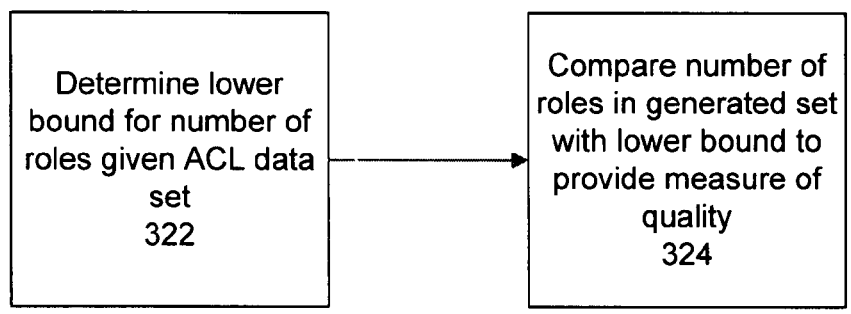
FIG. 3B    320

COMPUTER-IMPLEMENTED METHOD FOR ROLE DISCOVERY IN ACCESS CONTROL SYSTEMS

BACKGROUND

1. Field of the Invention

The present application relates generally to access control systems, and more particularly to role discovery in access control systems.

2. Description of the Background Art

In a simple access control system, access control lists (ACLs) are used. An ACL lists the user accounts (users) that have permission to use a given resource. The resource may be a file, or a network machine (with an internet protocol address), or a service provided by a port on a network machine, for example.

Such a set of ACLs may have a very large number of entries. As a simple example, if one thousand users each had permission to use one thousand different resources, then the ACL set would have a total of one million (one thousand multiplied by one thousand) entries. As the number of users and the number of resources grow, the size of this representation becomes extremely large and unwieldy. It becomes difficult to maintain, to check, to store, to present to an administrator, and to visualize on a graphics display. Ultimately, it becomes difficult, expensive, and error-prone to manage.

One way to reduce the size of the representation of the access permission is to utilize role-based access control (RBAC). In an RBAC system, a new kind of entity, the role, is introduced. Herein, a role may be defined as a set of permissions. Users may have or be assigned roles. A given role confers to its users permission to use certain resources.

In order to migrate from using a set of ACLs to using RBAC, an appropriate set of roles need to be discovered from the ACL data. The present application relates to a computer-implemented method of role discovery in access control systems.

BRIEF DESCRIPTION OF THE DRAWINGS

FIG. 1A is a diagram showing a bipartite relationship between users A1-A4 and resources B1-B5. FIG. 1B is a diagram with emphasis on user A1 and its permissions. FIG. 1C is a diagram showing the introduction of role C1, and the assignment of role C1 to user A1. FIG. 1D is a diagram with emphasis on user A4 and its permissions. FIG. 1E is a diagram showing the assignment of role C1 to user A4. FIG. 1F is a diagram showing the assignment of roles C2 and C3 to users A2 and A3, respectively.

FIG. 2B is a flow chart of a computer-implemented procedure for role discovery in access control systems where a user with fewest uncovered permissions is selected as the next user in accordance with an embodiment of the invention.

FIG. 3A is a flow chart of a computer-implemented procedure for role discovery in access control systems where multiple procedures are used independently for role discovery and a better set of roles is selected in accordance with an embodiment of the invention.

FIG. 3B is a flow chart of a computer-implemented procedure for providing a quantitative measure of quality for a generated set of roles in accordance with an embodiment of the invention.

DETAILED DESCRIPTION

Previous approaches to the problem of role discovery in access control systems generally aim to discover the smallest set of roles that covers all of the pre-existing permissions. An example of such an approach is disclosed in U.S. Patent Application Publication No. 2003/0172161, "Method and apparatus for role grouping by shared resource utilization," inventor Ron Rymon.

Applicants have observed at least the following weaknesses and problems with such previous approaches.

First, a given set of ACLs (ACL set) may not exactly represent the most desirable configuration of the system. In other words, the set of pre-existing user-to-resource permissions in the ACL set may be suboptimal in that a more optimal set of permissions may include additional permissions which are not present in the given ACL set.

Second, a set of roles that reproduces the pre-existing permissions may still be excessively complex and difficult to manage due to redundancy issues. In particular, redundancy in roles occurs when a user gets permission to use a resource through multiple different roles.

Third, finding the smallest set of roles that precisely reproduces the pre-existing permissions is computationally a very difficult problem to solve. The problem is in fact an NP-complete problem, which is a most difficult sub-class of non-deterministic polynomial time problems to solve.

Fourth, when heuristic methods are used, no quantitative measure is provided which indicates a distance of the heuristic solution from an optimal solution. This is a weakness because it is generally desirable for practical purposes to know how far the solution obtained is from the optimal solution.

The present application discloses several improvements which address the above-discussed weaknesses and problems with previous approaches. These improvements may be advantageously incorporated to facilitate the efficient and effective discovery of roles from a set of ACLs and also in subsequent optimization or re-optimization of an RBAC system.

Figure 1A:
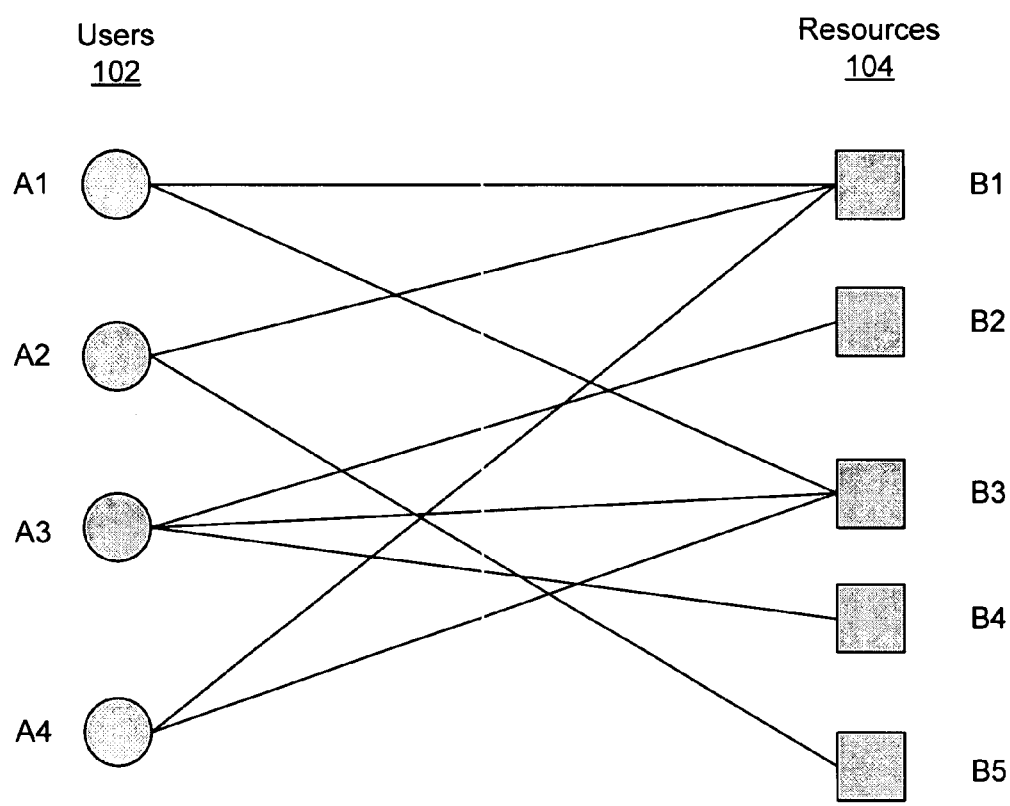
FIGS. 1A-1F are schematic diagrams depicting a simple example which is used for purposes of discussing embodiments of the present invention. More particularly.

Referring to FIG. 1A, a schematic diagram is presented showing a bipartite relationship between user accounts (users) 102 and resources 104. In this example, the individual users are labeled A1, A2, A3, and A4, and the individual resources are labeled B1, B2, B3, B4 and B5. Of course, in an actual network system employing an ACL set, the number of users and the number of resources may be much higher. Here, small numbers of users and resources are shown for purposes of simplified explanation.

Users may have permission to access one or more resources. In the diagram, these permissions are indicated by lines connecting users to resources. For example, user A1 has permission to access resources B1 and B3, user A2 has permission to access resources B1 and B5, and so on.

Figure 2A:
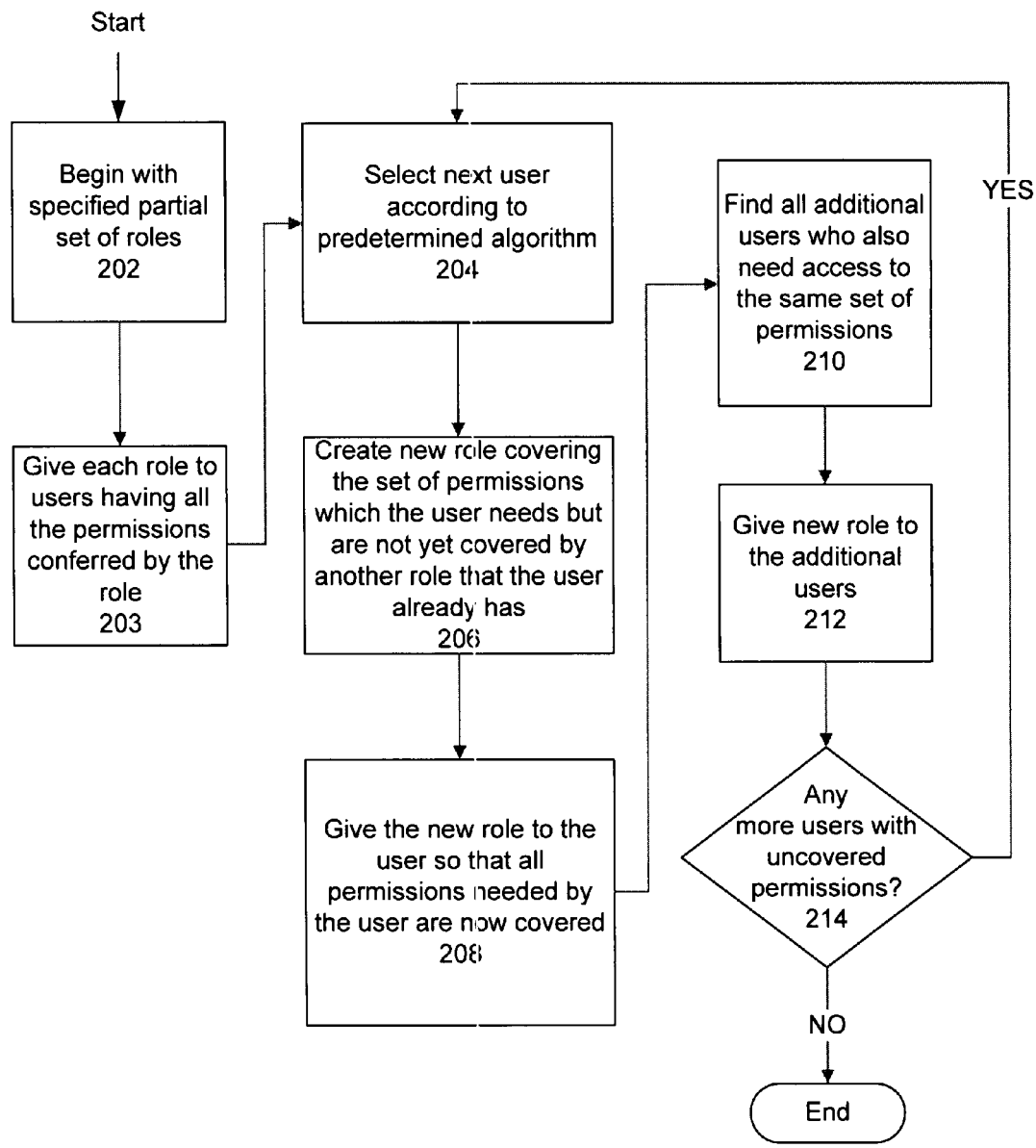
FIG. 2A is a flow chart of a computer-implemented procedure for role discovery in access control systems where a predetermined algorithm is used to select a next user in accordance with an embodiment of the invention.

Referring to FIG. 2A, a flow chart is shown of a computer-implemented procedure 200 for role discovery in access control systems where a predetermined algorithm is used to select a next user in accordance with an embodiment of the invention.

Optional first two step are shown in which a specified partial set of roles may be given at the beginning of the procedure (block 202) and each role is given to users having all permissions conferred by the role (block 203). For example, the partial set of roles may be specified by a system administrator. If any user's set of permissions is a superset of the permissions for any one role, that user may be assigned to that role, and the corresponding edges from the bipartite graph may be removed. Role discovery is then done on the remaining edges in the graph. In other words, if a partial set of roles is provided, then the subsequent steps may be utilized to extend the set of roles so as to cover the remaining uncovered permissions. Alternatively, these steps 202 and 203 may be skipped in cases where no such partial set of roles is specified.

In block 204, a next user is selected according to a predetermined algorithm. Various predetermined algorithms may be applied to select the next user.

In a first embodiment, the predetermined algorithm may be to select the user with fewest uncovered permissions remaining (not counting those users whose permissions are already all covered by roles). This embodiment is shown with specificity in the procedure 220 of FIG. 2B, where block 222 specifying selection of a user with the fewest uncovered permissions is substituted for block 204. In the example shown in FIG. 1A, users A1, A2 and A4 each have two permissions, while user A3 has three permissions. Assuming all these permissions are uncovered, then this specific algorithm may select user A1 (or user A2 or A4) as its two uncovered permissions is among the fewest.

Figure 2C:
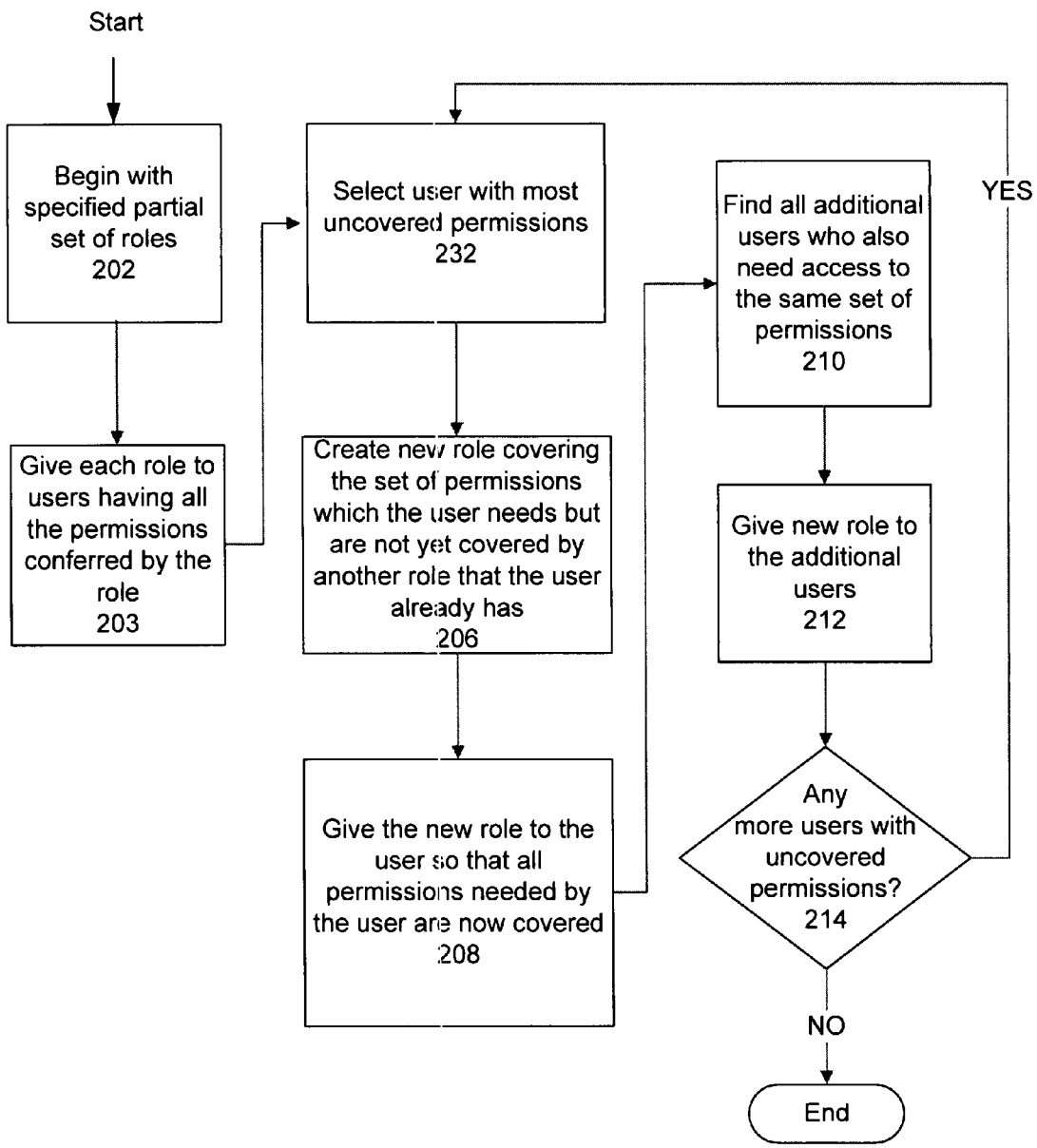
FIG. 2C is a flow chart of a computer-implemented procedure for role discovery in access control systems where a user with the most uncovered permissions is selected as the next user in accordance with an embodiment of the invention.

In a second embodiment, the predetermined algorithm may be to select the user with the most uncovered permissions remaining (not counting those users whose permissions are already all covered by roles). This embodiment is shown with specificity in the procedure 230 of FIG. 2C, where block 232 specifying selection of a user with the most uncovered permissions is substituted for block 204. In the example shown in FIG. 1A, users A1, A2 and A4 each have two permissions, while user A3 has three permissions. Assuming all these permissions are uncovered, then this specific algorithm may select user A3 as its three uncovered permissions is the most.

Figure 2D:
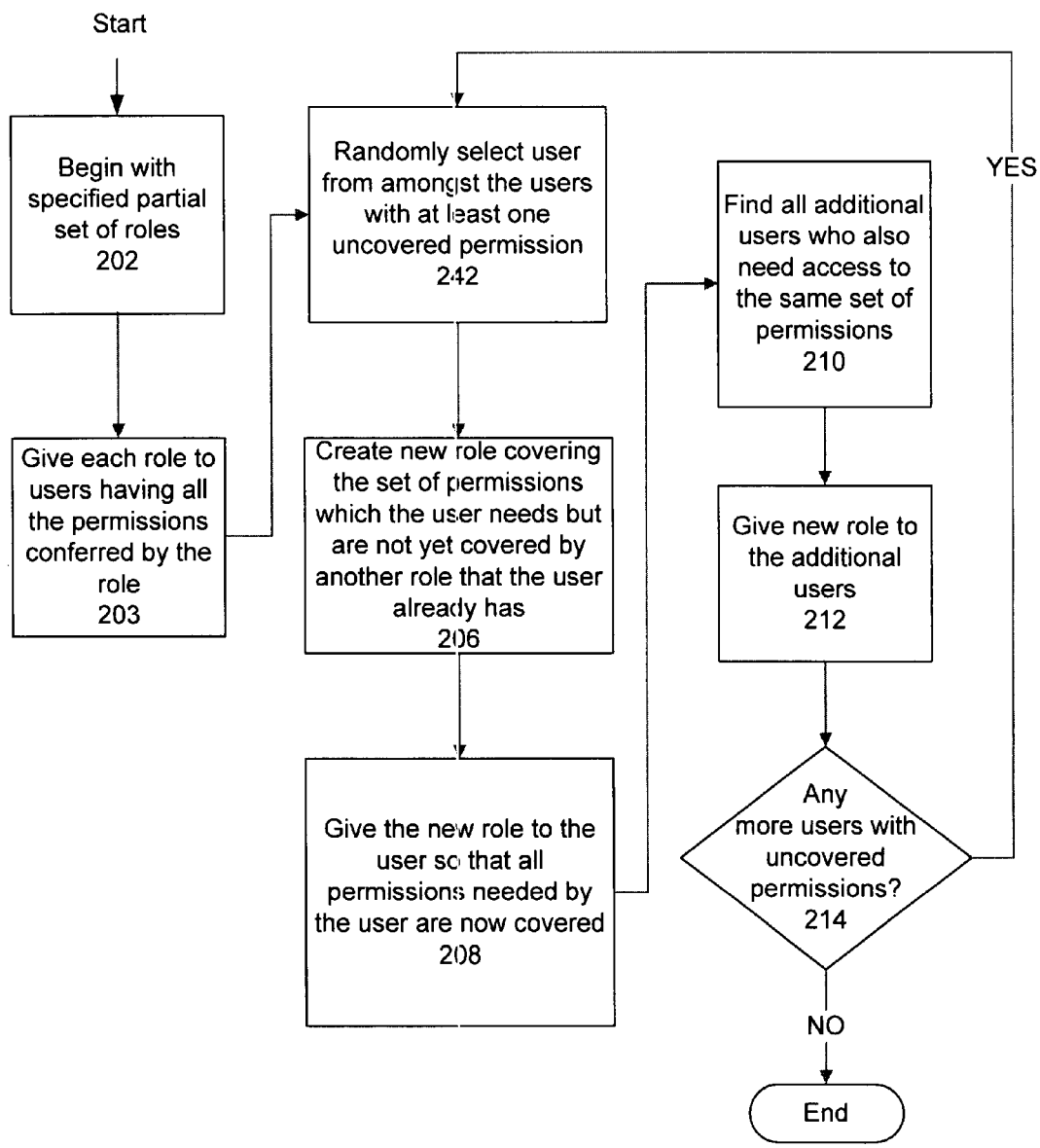
FIG. 2D is a flow chart of a computer-implemented procedure for role discovery in access control systems where a user is randomly selected from amongst the remaining users with one or more uncovered permissions in accordance with an embodiment of the invention.

In a third embodiment, the predetermined algorithm may randomly select a next user from the remaining users with at least one uncovered permission (not counting those users whose permissions are already all covered by roles). This embodiment is shown with specificity in the procedure 240 of FIG. 2D, where block 242 specifying random selection is substituted for block 204. In the example shown in FIG. 1A, assuming users A1-A4 each have at least one uncovered permission, then this specific algorithm may randomly select from amongst these four users. On the other hand, if user A1 had all of its permissions already covered by a role or roles, then this specific algorithm would randomly select from amongst the group of users including users A2, A3 and A4, but not A1.

Figure 1B:
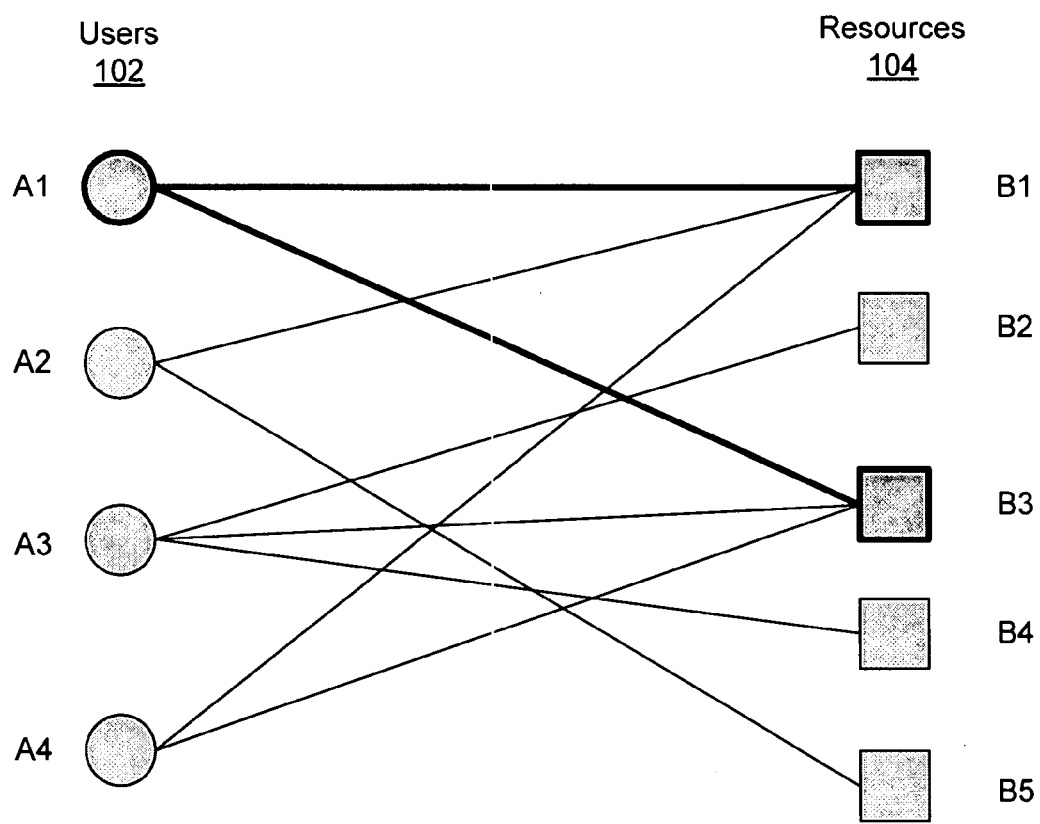
Figure 1C:
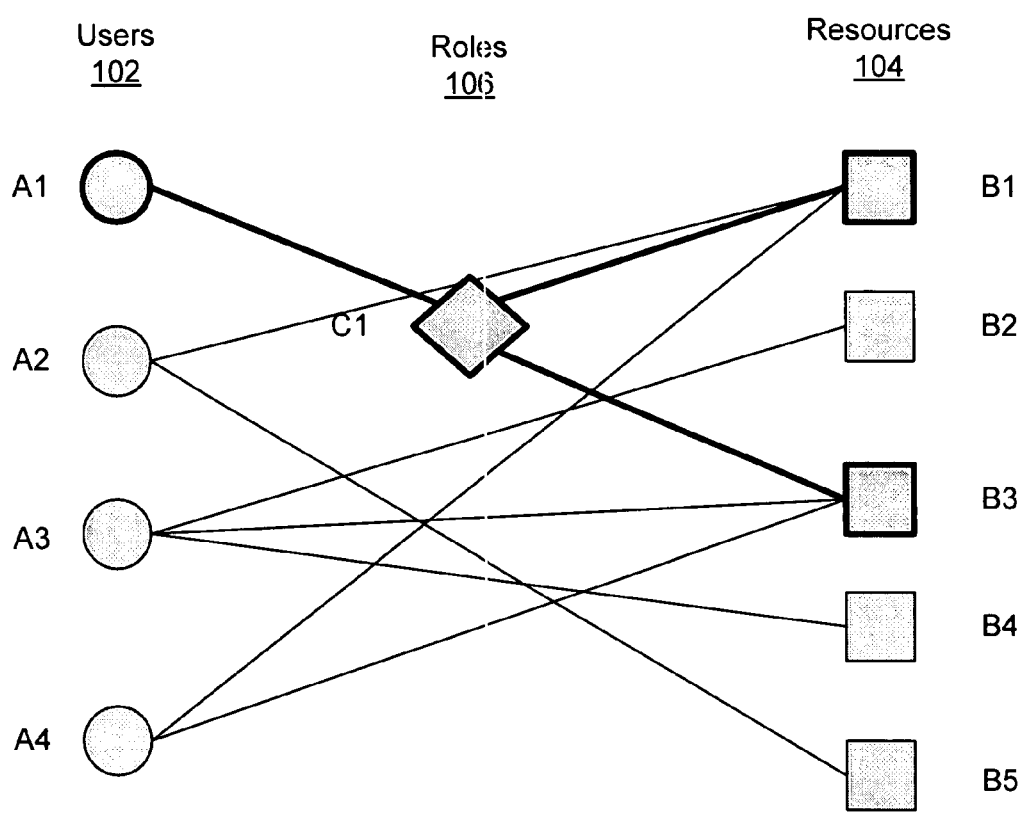

In block 206, a new role is created where the new role covers the set of permissions which the selected user still needs in that they are not yet covered by any other role that the user has. For example, consider FIG. 1A, assuming the case where none of the permissions shown have been covered so far, and further that the selected user (per block 204) is user A1. As emphasized in FIG. 1B, user A1 has permission to access resources B1 and B3. Hence, in this example, a new role would be created to cover permissions to access resources B1 and B3. Such a new role, labeled C1 is shown in FIG. 1C. As seen, role C1 provides permission to access resources B1 and B3.

Per block 208, the new role is given to the selected user. Since the new role covers all the previously uncovered permissions of the selected user, the selected user now has all its permissions covered by roles. For example, FIG. 1C shows by the line between user A1 and role C1 that user A1 is given role C1. Further, it is shown that all the permissions of user A1 are now covered by roles (in this case, by role C1).

Figure 1D:
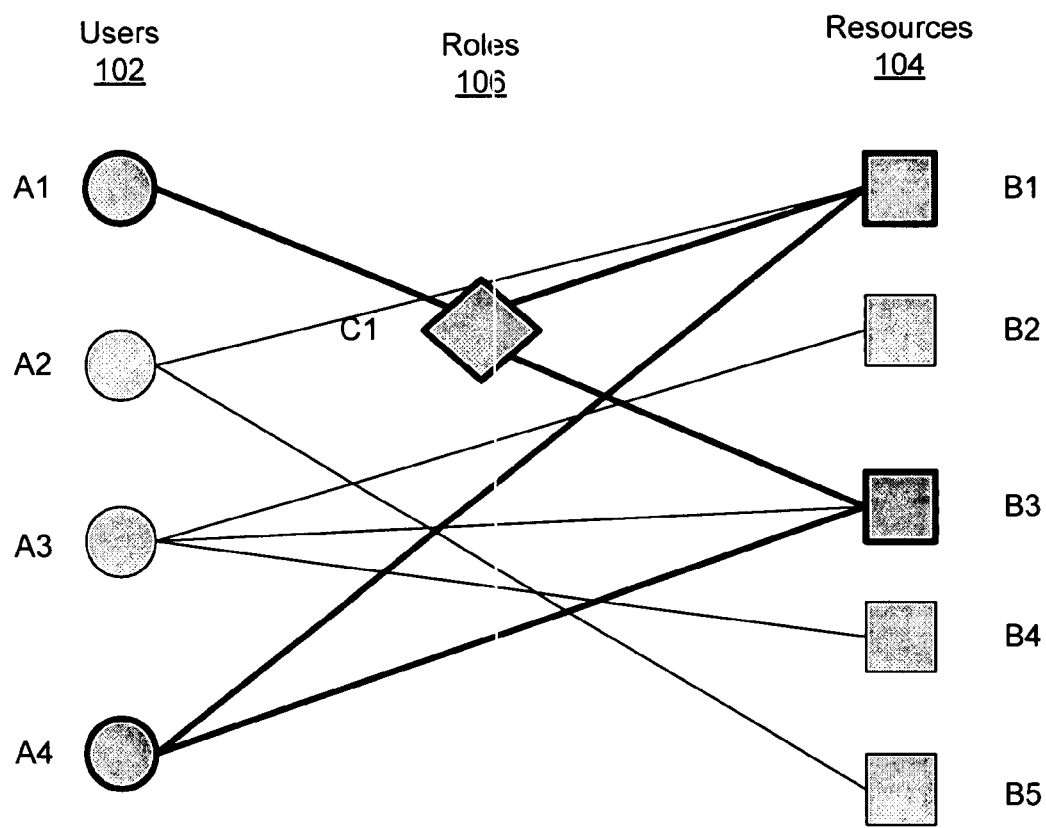

In block 210, all additional users who also need access to the same set of permissions are found. In other words, all users who also have the same uncovered permissions are found. In our example, as emphasized in FIG. 1D, user A4 also has uncovered permissions to resources B1 and B3. Hence, user A4 is an additional user who also needs access to the same set of permissions.

Figure 1E:
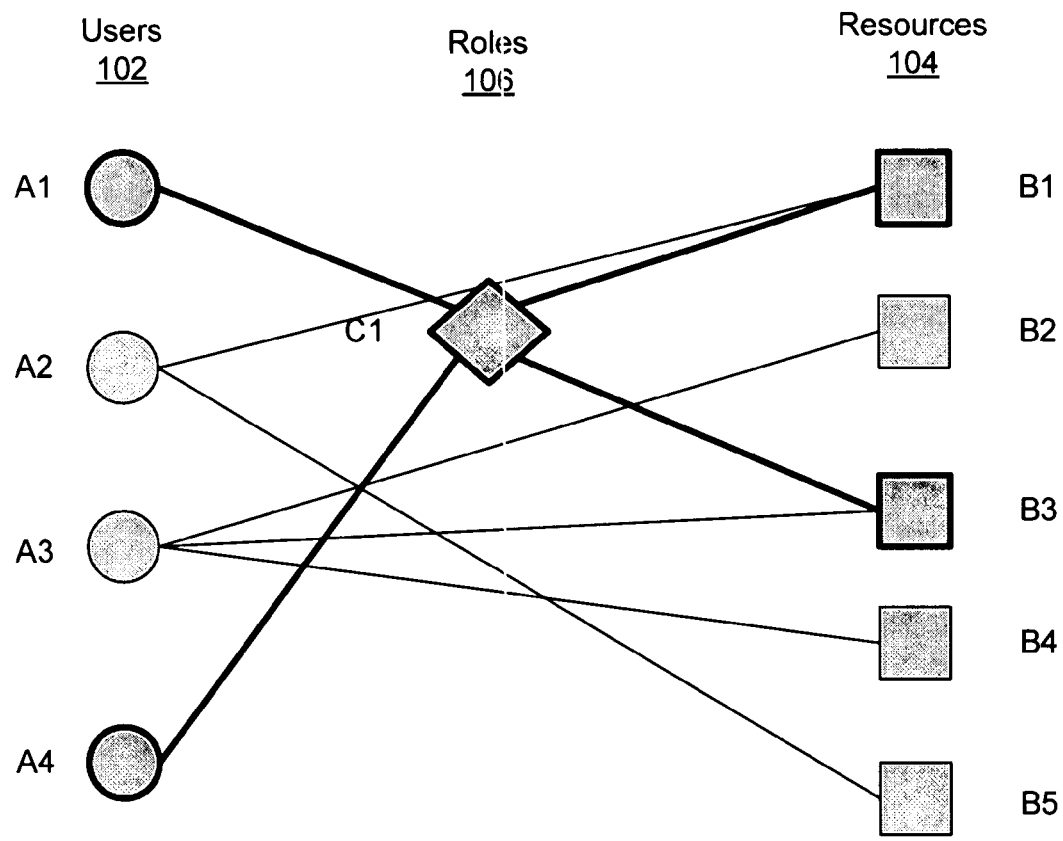

Per block 212, the new role is also given to the additional users (found per block 210). For example, FIG. 1E shows by the line between user A4 and role C1 that user A4 is also given role C1.

Per block 214, a determination may then be made as to whether there are any more users with uncovered permissions.

Figure 1F:
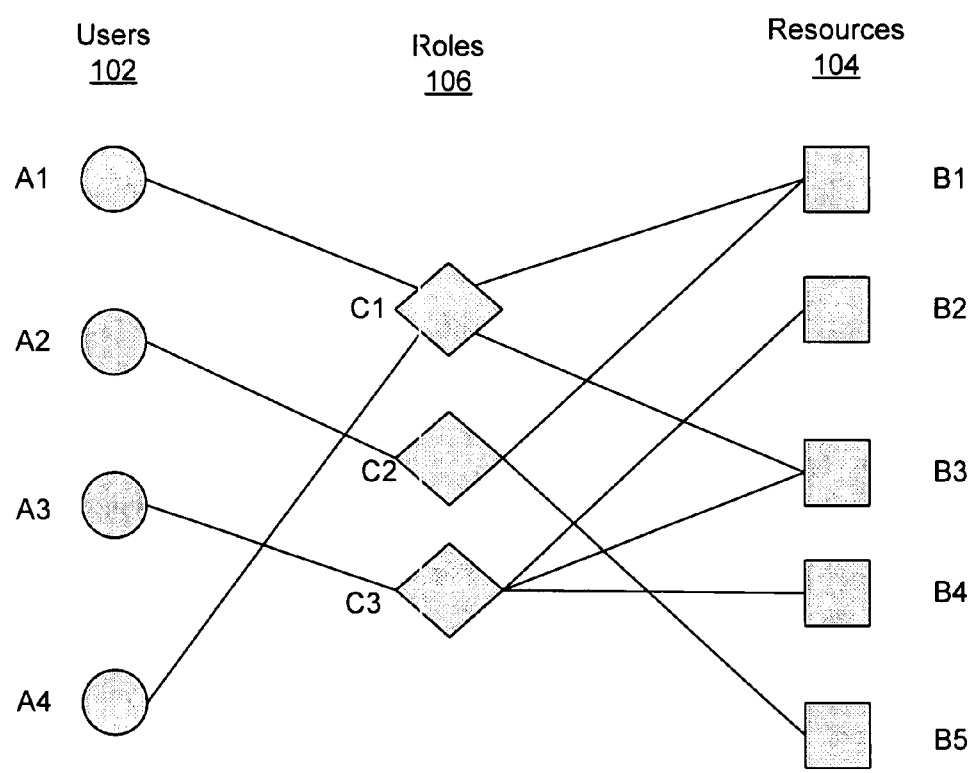

If there are one or more users with uncovered permissions remaining, then the procedure loops back to block 204 and selects the next user according to the predetermined algorithm. For example, FIG. 1F shows diagrammatically the addition of the new role C2 to cover the permissions of the user A2, and the addition of the new role C3 to cover the permissions of the user A3.

On the other hand, if there are no more users with uncovered permissions remaining, then the procedure may end as all the bipartite permissions have been covered by roles.

FIG. 3A is a flow chart of a computer-implemented procedure 300 for role discovery in access control systems where multiple procedures are used independently for role discovery and a better set of roles is selected in accordance with an embodiment of the invention.

Per blocks 302 and 304, role discovery may be performed by two (or more) different automated techniques. In the particular example shown, role discovery may be performed 302 per FIG. 2B, where the computer-implemented procedure 220 includes selecting 222 a next user to be a user which has the fewest uncovered permissions remaining. Role discovery may also be performed 304 per FIG. 2C, where the procedure 230 includes selecting 232 a next user to be a user which has the most uncovered permissions remaining. Thereafter, the set of roles which has the fewer roles may be selected per block 306. Alternatively, other criteria may be used to determine the preferable set of roles to select.

In addition, per block 308, the automatically discovered set of roles may be simplified. One or more computer-implemented procedures may be used to reduce complexity of the set of roles. One particular complexity-reducing procedure 400 removes overlap between roles and is discussed further below in relation to FIG. 4. Another particular complexity-reducing procedure 500 proposes roles that are over-approximations and is discussed further below in relation to FIG. 5.

FIG. 3B is a flow chart of a computer-implemented procedure 320 for providing a quality measure for a generated set of roles in accordance with an embodiment of the invention. This procedure 320 may be applied, for example, to the set of roles determined by the procedure 300 of FIG. 3A.

As shown per block 322, a determination may be made as to a lower bound L for the number of roles given an ACL data set. The determination may be made by finding a set consisting of L individual permissions (a single user and single resource that the user has permission to access) with the property that for any two of these individual permissions, they cannot both be conferred by any one role. In other words, the set found contains only mutually independent permissions. A pair of permissions is mutually independent if they relate to two distinct users and to two distinct resources, and either or both of these two users does not have permission to use both of these two resources.

Thereafter, per block 324, the number of roles in the discovered (or otherwise generated) set of roles may be compared to the lower bound. The gap between the number of roles in the set and the lower bound provides a quantitative measure of the quality of the set of roles, such that a smaller gap provides a higher level of confidence in the generated set of roles.

Figure 4:
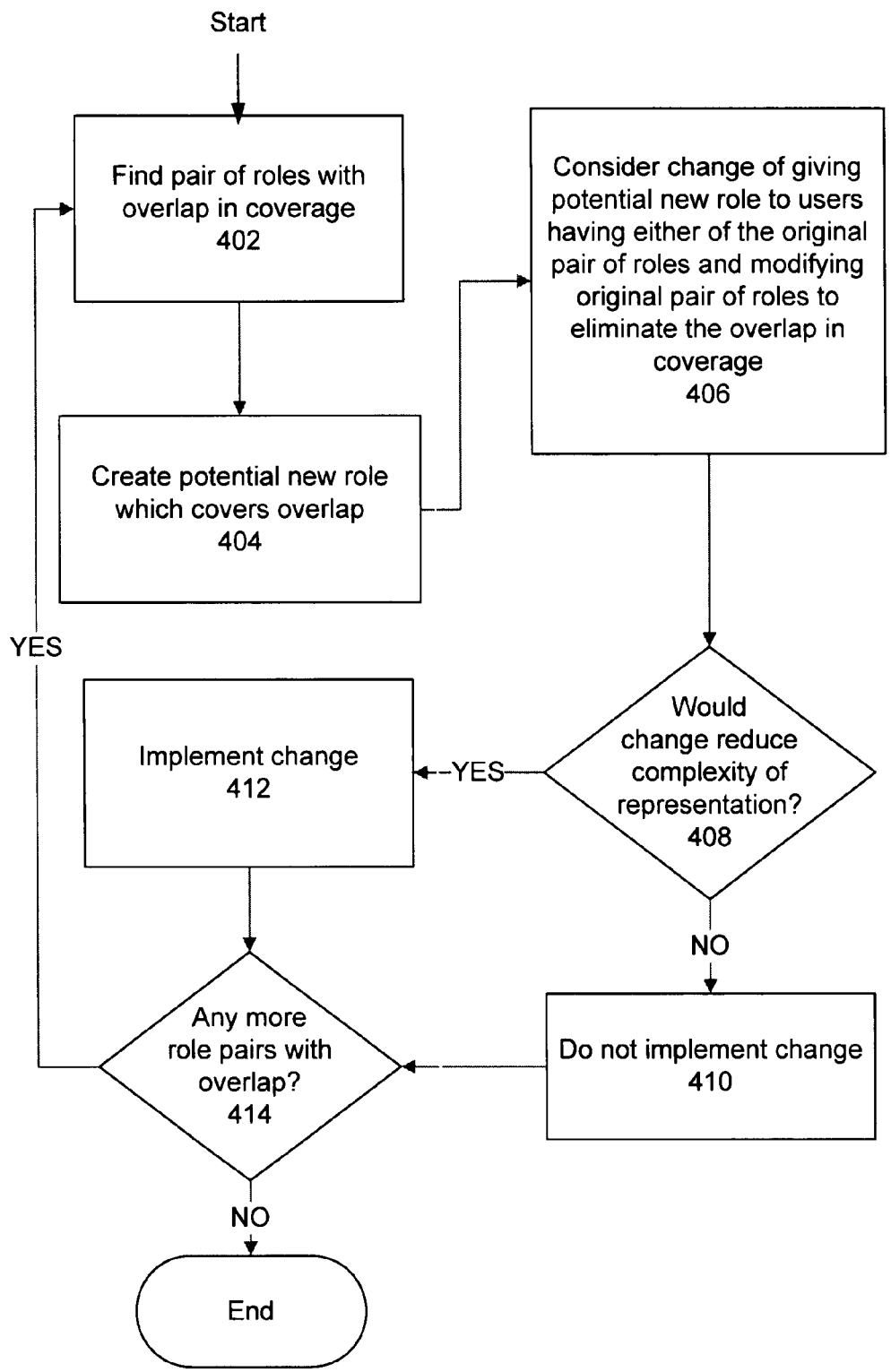
FIG. 4 is a flow chart of a computer-implemented procedure for reducing complexity in a set of roles by eliminating overlap between pairs of roles in accordance with an embodiment of the invention.

FIG. 4 is a flow chart of a computer-implemented procedure 400 for reducing complexity in a set of roles by removing overlap between pairs of roles in accordance with an embodiment of the invention. This procedure 400 may be used, for example, as part of block 308 in FIG. 3 to simplify the set of discovered roles.

Figure 7A:
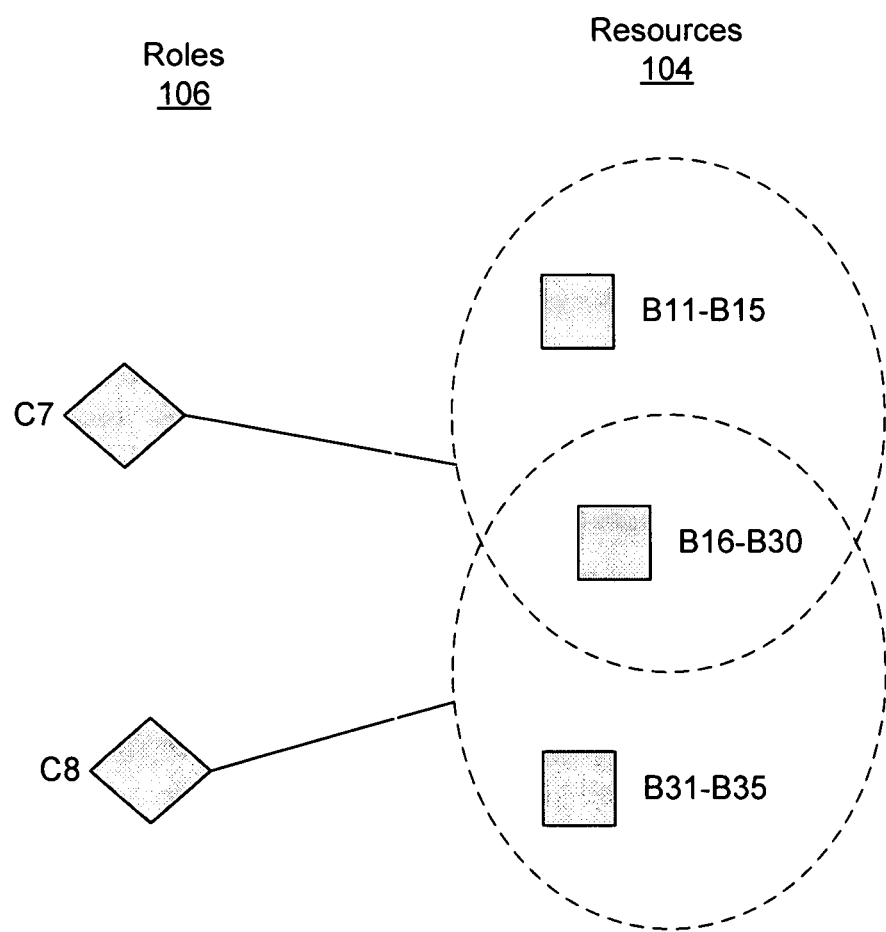
FIGS. 7A and 7B are schematic diagrams showing original and modified role sets, where the modified role set has reduced complexity due to removal of overlap, in accordance with an embodiment of the invention.

In block 402, a pair of roles with overlapping coverage (i.e. overlapping permissions to access resources) is found. For example, consider the pair of roles C7 and C8, where C7 covers (i.e. gives permission to access) resources B11 through B30, and C8 covers resources B16 through B35. The original roles in this example are depicted in FIG. 7A. Here, the overlapping coverage (overlap in permissions) is to resources B16 through B30.

Per block 404, a potential new role is created which covers overlap in permissions. In our example, potential new role CX is created which covers resources B16 through B30.

Figure 7B:
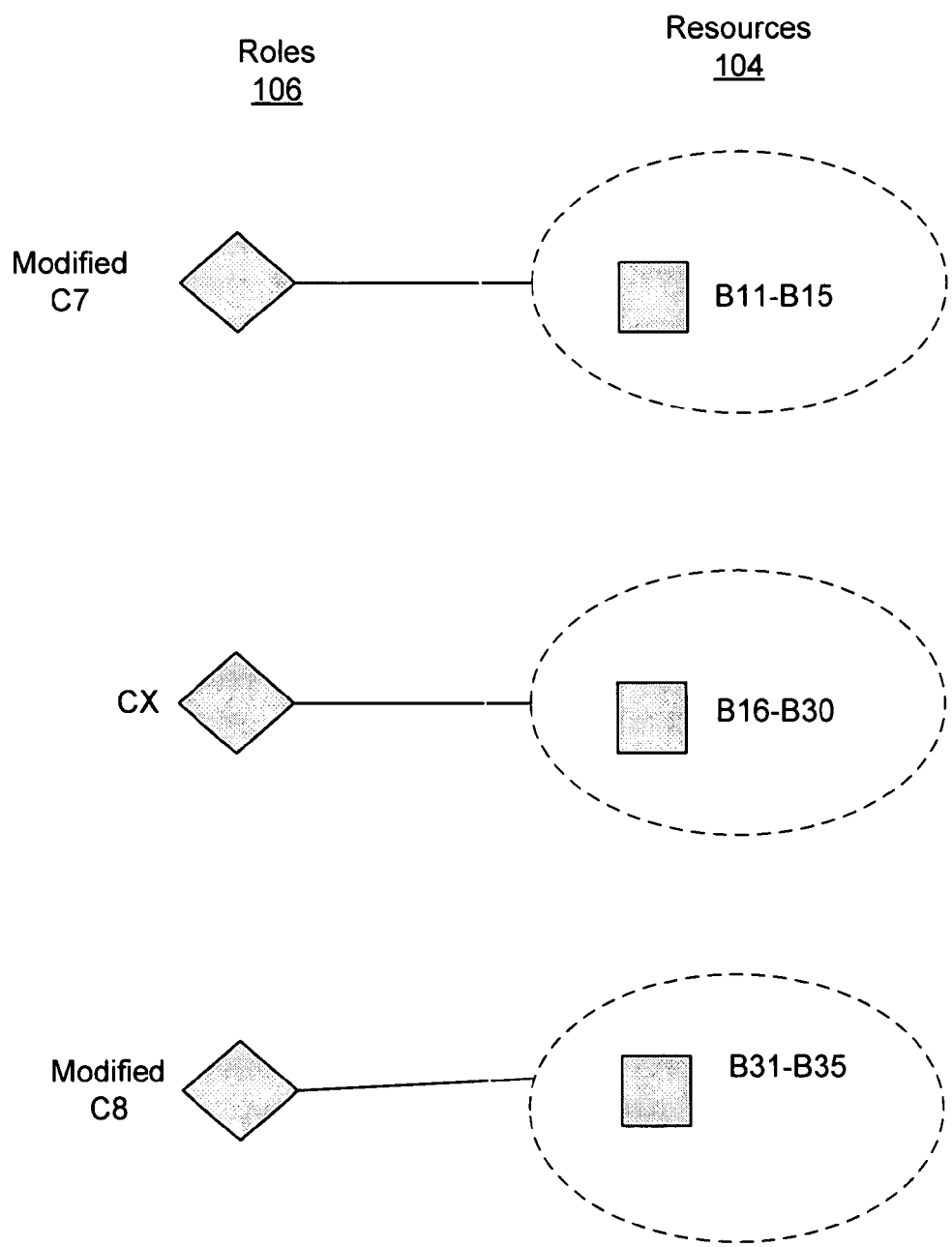

In block 406, consideration is given to making a change to the role set by adding the new potential role, giving the new potential role to users having either of the original pair of roles, and modifying the original pair of roles to eliminate the overlap in coverage. In our example, the change would involve adding role CX which covers resources B16 through B30, giving role CX to users having either role C7 or C8, and modifying roles C7 and C8 to eliminate the overlapping coverage of resources B16 through B30. After the modification, role C7 would only cover resources B11 through B15, and role C8 would only cover resources B31 through B35. The modified roles in this example are shown in FIG. 7B.

Per block 408, a determination may then be made as to whether the change being considered would reduce the complexity of the RBAC representation. In one embodiment, the complexity of the RBAC representation may be calculated as the total number of "edges" between users 102 and roles 106, plus the total number of "edges" between roles 106 and resources 104, plus the total number of roles 106. In other words, this measure sums over all the roles the summand comprising the number of users who have each role and the number of resources granted by each role, and then adds the number of roles. This measure gives a number of entities that must be maintained by the system.

If the change being considered would not reduce the complexity of the representation, then, per block 410, the change is not actually implemented. On the other hand, if the change being considered reduces the complexity of the representation, then, per block 412, the change is implemented.

The procedure 400 then continues on by determining, per block 414, whether or not there are any more role pairs with overlap that have yet to be analyzed per the above-discussed steps. If there are any more role pairs with overlap to be analyzed, then the procedure may loop back to block 402 so as to analyze these pairs to see if the representation may be further simplified. Otherwise, if there are no more role pairs with overlap to be analyzed, then the procedure may end.

Applicants have found that the above-discussed procedure 400 is often effective in reducing the size of an RBAC representation by a factor of two or more. Advantageously, reducing the size of the RBAC representation reduces the number of entities that are to be maintained by the system.

Figure 5:
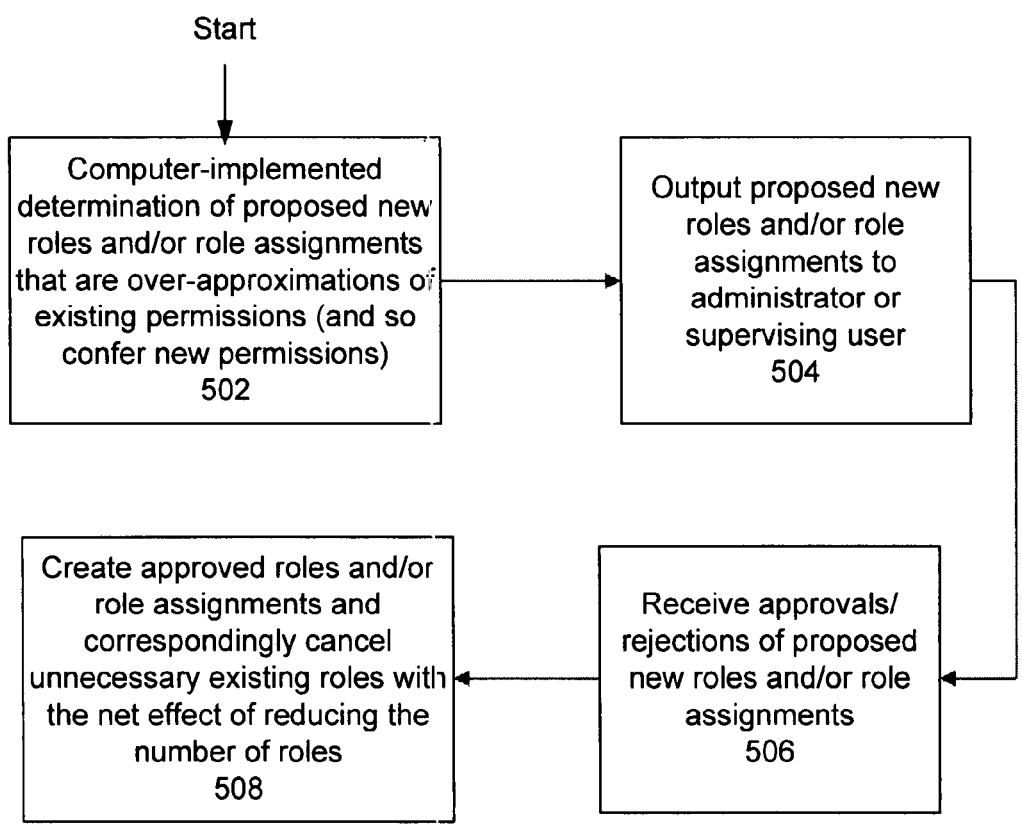
FIG. 5 is a flow chart of a computer-implemented procedure for reducing complexity in a set of roles by proposing roles that are over-approximations of existing permissions in accordance with an embodiment of the invention.

FIG. 5 is a flow chart of a computer-implemented procedure 500 for reducing complexity in a set of roles by proposing roles that are over-approximations of existing permissions in accordance with an embodiment of the invention. This procedure 500 may be used, for example, as part of block 308 in FIG. 3 to simplify the set of discovered roles. The procedure 500 of FIG. 5 may be used in addition to the procedure 400 of FIG. 4, or may be used separately therefrom.

In block 502, a computer-implemented determination is made of proposed new roles and/or role assignments that are over-approximations of existing permissions and so confer new permissions which are not in the original ACL data. For example, two existing roles may have 95% overlap in permissions. In this case, a proposal may be output that a new role be created in place of the two existing roles. In another example, a particular user may have 90% of the permissions associated with a certain role, but not yet have that certain role. In this case, a proposal may be output for the particular user to have (i.e. be assigned) that certain role.

The proposals may be output to an administrator or supervising user for approval per block 504. Per block 506, approvals and/or rejections of the proposed new roles and/or role assignments may then be received by the computer system. The system may then create the approved new roles and/or role assignments and correspondingly cancel unnecessary existing roles or role assignments per block 508. The net effect is that the complexity of the RBAC representation is reduced.

Figure 6:
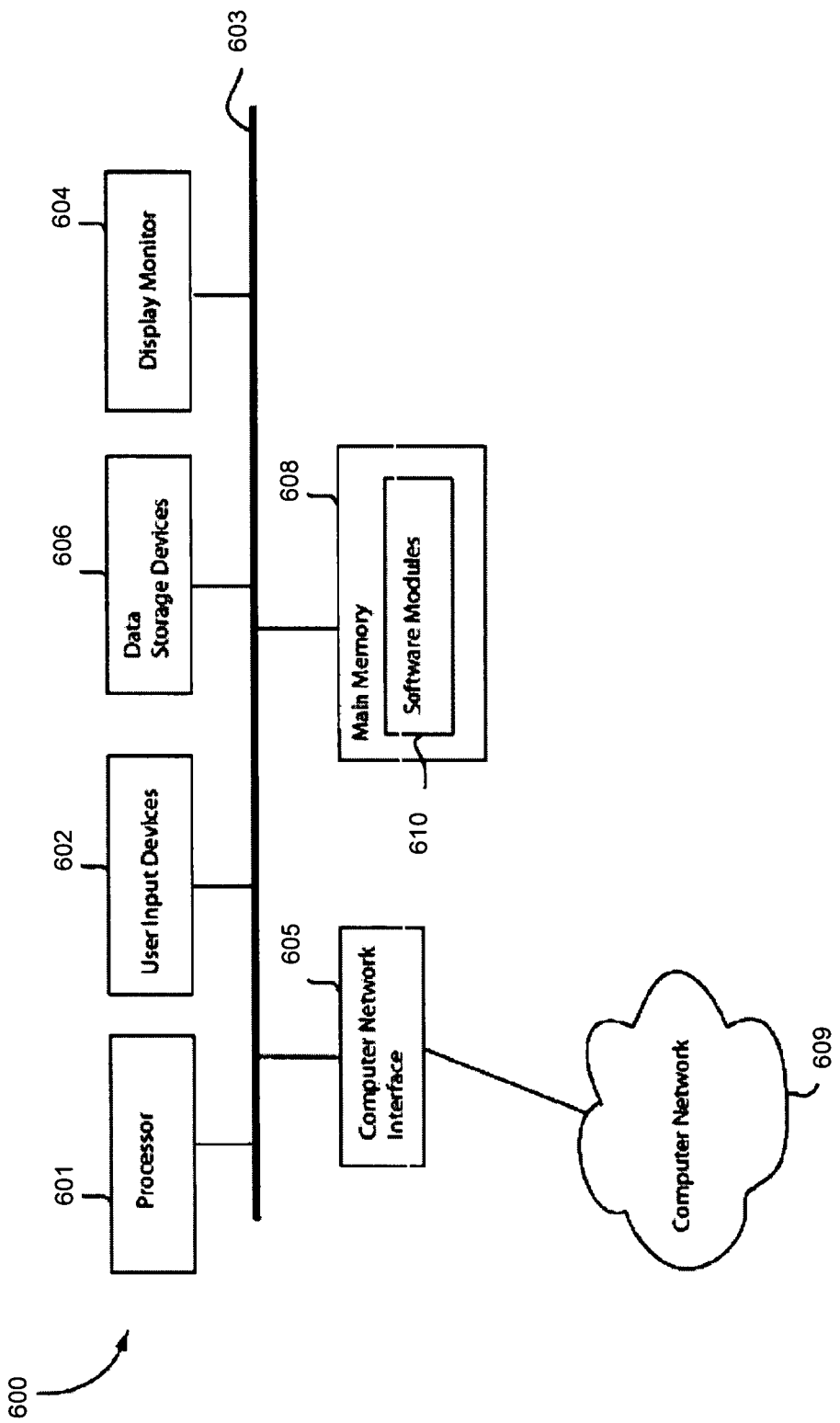
FIG. 6 is a schematic diagram of an example computer system which may be used to execute the computer-implemented procedures for role discovery in accordance with an embodiment of the invention.

FIG. 6 is a schematic diagram of an example computer system or apparatus 600 which may be used to execute the computer-implemented procedures for role discovery in accordance with an embodiment of the invention. The computer 600 may have less or more components than illustrated. The computer 600 may include a processor 601, such as those from the Intel Corporation or Advanced Micro Devices, for example. The computer 600 may have one or more buses 603 coupling its various components. The computer 600 may include one or more user input devices 602 (e.g., keyboard, mouse), one or more data storage devices 606 (e.g., hard drive, optical disk, USB memory), a display monitor 604

(e.g., LCD, flat panel monitor, CRT), a computer network interface 605 (e.g., network adapter, modem), and a main memory 608 (e.g., RAM).

In the example of FIG. 6, the main memory 608 includes software modules 610, which may be software components to perform the above-discussed computer-implemented procedures. The software modules 610 may be loaded from the data storage device 606 to the main memory 608 for execution by the processor 601. The computer network interface 605 may be coupled to a computer network 609, which in this example includes the Internet.

A real world example of a dataset of an access control system includes 3,477 user accounts, 1,567 computer resources, and 105,205 permissions. Using the techniques discussed above, a role set was determined which covered all the permissions. The role set included 220 roles. A maximal independent set of 172 "edges" was determined, so a lower bound of 172 roles was found. The 220 roles in the discovered role set is within 30% of the lower bound.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A computer-implemented method for role discovery in access control systems, the method comprising:
    selecting a user account according to a predetermined algorithm;
    creating a new role covering a set of permissions including all permissions which the user account needs but is not yet covered by another role that the user account has;
    giving the new role to the user account so that all permissions needed by the user account are covered;
    finding any additional user accounts which still need the set of permissions covered by the new role; and
    giving the new role to the additional user accounts, if any.

2. The computer-implemented method for role discovery of claim 1, wherein the predetermined algorithm comprises selecting a user account having a fewest uncovered permissions from among user accounts having at least one uncovered permission.

3. The computer-implemented method for role discovery of claim 1, wherein the predetermined algorithm comprises selecting a user account having a most uncovered permissions from among user accounts having at least one uncovered permission.

4. The computer-implemented method for role discovery of claim 1, wherein the predetermined algorithm comprises a random selection of a user account from among user accounts having at least one uncovered permission.

5. The computer-implemented method for role discovery of claim 1, wherein the method is repeated until there are no more users with uncovered permissions.

6. The computer-implemented method for role discovery of claim 5, further comprising receiving an initial partial set of roles.

7. The computer-implemented method of claim 1, further comprising:
    a simplifying procedure to reduce a complexity of a discovered set of roles.

8. The computer-implemented method of claim 7, wherein the simplifying procedure comprises:
    finding a pair of roles with overlap in coverage;
    creating a potential new role which covers said overlap;
    considering a change where the potential new role is given to user accounts having either of said pair of roles and modifying said pair of roles to eliminate said overlap;
    determining whether said change reduces said complexity; and
    implementing said change if said change reduces said complexity.

9. The computer-implemented method of claim 7, wherein the simplifying procedure comprises:
    determining a proposed new role which is an over-approximation of existing permissions;
    outputting the proposed new role to a supervising user; and
    upon receiving approval of the proposed new role, creating the proposed new role and correspondingly canceling unnecessary existing roles.

10. The computer-implemented method of claim 7, wherein the simplifying procedure comprises:
    determining a proposed new role assignment which is an over-approximation of existing permissions;
    outputting the proposed new role assignment to a supervising user; and
    implementing the proposed new role assignment upon receiving approval.

11. The computer-implemented method of claim 1, further comprising:
    determining a lower bound for a number of roles given a data set for the access control system; and
    outputting a comparison of a number of roles in a discovered role set and the lower bound to provide a quantitative measure of quality of the discovered role set.

12. An automated method for discovery of roles for an access control system, the method comprising:
    creating at least two potential roles using at least two independent procedures each potential role covering a set of permissions including all permissions which a user account needs but is not yet covered by another role that the user account has;
    generating at least two potential role sets each comprising one of the at least two potential roles;
    comparing said role sets to determine a preferred role set;
    selecting the preferred role set; and
    identifying a new role based at least in part on the selection of the preferred role set.

13. The automated method of claim 12, wherein at least one of the independent procedures comprises:
    selecting a user account according to a predetermined algorithm;
    giving the new role to the user account so that all permissions needed by the user account are covered;
    finding any additional user accounts which still need the set of permissions covered by the new role; and
    giving the new role to the additional user accounts, if any.

14. The automated method of claim 12, wherein the independent procedures include a first procedure and a second procedure, each of the first and second procedures comprising:
- selecting a user account according to a predetermined algorithm;
- giving the new role to the user account so that all permissions needed by the user account are covered;
- finding any additional user accounts which still need the set of permissions covered by the new role; and
- giving the new role to the additional user accounts, if any.

15. The automated method of claim 14, wherein the predetermined algorithm for the first procedure comprises selecting a user account having a fewest uncovered permissions from among user accounts having at least one uncovered permission, and wherein the predetermined algorithm for the second procedure comprises selecting a user account having a most uncovered permissions from among user accounts having at least one uncovered permission.

16. The automated method of claim 12, further comprising:
- a simplifying procedure to reduce a complexity of the preferred role set.

17. The automated method of claim 12, further comprising:
- determining a lower bound for a number of roles given a data set for the access control system; and
- outputting a comparison of a number of roles in the preferred role set and the lower bound to provide a quantitative measure of quality of the preferred role set.

18. A non-transitory computer-readable medium configured with computer-readable program code to perform automated role discovery for an access control system, the non-transitory computer-readable medium comprising:
- computer-readable program code configured to choose a user account according to a predetermined algorithm;
- computer-readable program code configured to generate a new role covering a set of permissions including all permissions which the user account needs but is not yet covered by another role that the user account has;
- computer-readable program code configured to assign the new role to the user account so that all permissions needed by the user account are covered;
- computer-readable program code configured to determine any additional user accounts which still need the set of permissions covered by the new role; and
- computer-readable program code configured to assign the new role to the additional user accounts, if any.

19. The non-transitory computer-readable medium of claim 18, further comprising:
- computer-readable program code configured to perform a simplifying procedure to reduce a complexity of a discovered role set.

20. The non-transitory computer-readable medium of claim 18, further comprising:
- computer-readable program code configured to determine a lower bound for a number of roles given a data set for the access control system; and
- computer-readable program code configured to output a comparison of a number of roles in a discovered role set and the lower bound to provide a quantitative measure of quality of the discovered role set.

21. A non-transitory computer-readable medium configured with computer-readable program code to perform automated role discovery for an access control system, the non-transitory computer-readable medium comprising:
- computer-readable program code configured to generate a plurality of role sets, each role set comprising a new role covering a set of permissions including all permissions which a user account needs but is not yet covered by another role that the user account has;
- computer-readable program code configured to compare said plurality of role sets to determine a preferred role set; and
- computer-readable program code configured to select the preferred role set.

* * * * *